US007087707B2

(12) United States Patent
Keller et al.

(10) Patent No.: US 7,087,707 B2
(45) Date of Patent: Aug. 8, 2006

(54) SYNTHESIS OF OLIGOMERIC CYANATE ESTERS

(75) Inventors: Teddy M. Keller, Fairfax Station, VA (US); Matt Laskoski, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/825,799

(22) Filed: Apr. 14, 2004

(65) Prior Publication Data

US 2006/0155104 A1    Jul. 13, 2006

Related U.S. Application Data

(60) Provisional application No. 60/529,240, filed on Dec. 15, 2003.

(51) Int. Cl.
*C08G 73/00* (2006.01)

(52) U.S. Cl. .................. 528/367; 528/86; 528/196; 528/208; 528/368; 528/423; 528/480; 528/486; 528/488; 528/495

(58) Field of Classification Search .................. 528/86, 528/196, 208, 367, 368, 423, 480, 486, 488, 528/495, 425
See application file for complete search history.

(56) References Cited

U.S. PATENT DOCUMENTS 3,738,962 A    6/1973  Loudas et al.

4,042,567 A    8/1977  Sundermann et al.
5,352,760 A    10/1994 Keller et al.
2003/0229198 A1    12/2003  Keller et al.

FOREIGN PATENT DOCUMENTS

JP    5-78446    3/1993

OTHER PUBLICATIONS

Chang et al, Polar interaction in a cyanated poly(ether sulfone) modified polycyanurate, 1998, Chem Abstract 130: 4439.*
Abed et al, Synthesis and characterization of new phosphorus—networks, 1997, Chem Abstract 126: 293637.*
Abed et al, Synthesis of novel monomers for cyanate ester matrixes, 1994, Chem Abstract 120; 135811.*
Suzuki et al, Thermosetting resin compositions for manufacture of laminates and their uses, 1994, Chem Abstract 120: 109005.*

(Continued)

*Primary Examiner*—Duc Truong
(74) *Attorney, Agent, or Firm*—John J. Karasek; Joseph T. Grunkemeyer

(57) ABSTRACT

A cyanate ester system is disclosed. An aryl ether oligomer may be made from a dihydroxyaromatic compound and a dihaloaromatic compound in the presence of a base. The oligomer is then reacted with a cyanide compound in the presence of a base to form the cyanate ester shown below. The cyanate ester may then be cross-linked to a thermoset having triazine ring cross-links.

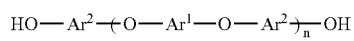

4 Claims, 2 Drawing Sheets

OTHER PUBLICATIONS

Srinivasan et al, Effect of backbone chemistry—poly(arylene ether sulfones, 1994, Chem Abstract 120: 108429.*

Sundermann et al, s-Triazine prepolymers, 1976, Chem Abstract 85: 78980.*

Loudas et al, Cyanurates of cyanatophenyl-terminated poly(arylene ethers), 1973, Chem Abstrcat 79: 54306.*

Srinivasan et al, "Amorphous bisphenol-A based poly (arylene ether)modified cyanate ester networks", High Perform. Polym., 1993, pp. 259-274, vol. 5.

Iijima et al, "Modification of Cyanate Ester Resin by Poly(ethylenephthalate) and Related Copolyesters", Journal of Applied Polymer Science, 2000, pp. 208-201, vol. 76.

Abed et al., "Synthesis of Novel Monomers for Cyanate Ester Matrices," Polym. Preprints, 33(2), 233 (1992).

Abed et al., "Synthesis and Characterization of New Phosphorus and Other Heteroatom Containing Aryl Cyanate Ester . . . ," J. Polym. Sci. A: Polym. Chem., 35(6), 977 (1997).

Chang et al., "Polar interaction in a cyanated poly(ether sulfone)-modified polycyanurate," Polymer, 39(20), 7119 (1998).

Srinivasan et al., "Effect of Backbone Chemistry & Functional Termination . . . " Polym. Preprints, 33(2), 325 (1992).

* cited by examiner

SYNTHESIS OF OLIGOMERIC CYANATE ESTERS

This application claims the benefit of the U.S. Provisional Application No. 60/529,240 filed on Dec. 15, 2003, incorporated by reference.

BACKGROUND OF THE INVENTION

1. Field of the Invention

The invention relates generally to cyanate esters and thermosets made therefrom.

2. Description of the Prior Art

Cyanate ester (CE) resins have received considerable attention due to their importance as a thermosetting resin for use in the electronics, aerospace, and adhesive industries. Cyanate ester resins have found extensive use in applications where low-dielectric and high thermal stability materials are needed. Such applications include printed circuit boards and radomes. More recently, CE resins have been proposed for use as the matrix in structural composites for aircrafts. In aerospace applications, it may be desirable for the matrix material to show high temperature stability, low flammability, high strength, and toughness.

CEs can have the processability of epoxies with the heat and fire resistance of phenolic resins. They can have their own unique properties such as good strength, low dielectric constants, radar transparency, low water absorption, and superior metal adhesion. These properties can make them useful for high performance applications. Current CE resins have the required flammability but are too brittle for use alone as matrix materials for structural applications.

To enhance the toughness, modifiers such as thermoplastics and elastomers have been blended with the CE resins, which have had a negative impact on the flammability. A variety of CE monomers have been synthesized containing polystyrene, substituted phenols and allyl-functionalized moieties. These CE monomers cure alone or by the aid of a catalytic amount of a metal salt into a triazine network.

SUMMARY OF THE INVENTION

The invention comprises an oligomer comprising the formula:

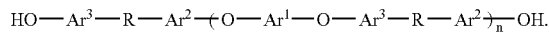

$Ar^1$, $Ar^2$, and $Ar^3$ are independently selected divalent aromatic radicals selected from the group consisting of a substituted or unsubstituted aromatic ring, substituted or unsubstituted fused aromatic rings, and a substituted or unsubstituted aromatic ring assembly without intervening groups. R is a substituted or unsubstituted divalent organic or sulfone group. The variable n is a positive integer.

The invention further comprises a process comprising the steps of: providing a dihydroxyaromatic, providing a dihaloaromatic, and reacting the dihydroxyaromatic compound with the dihaloaromatic compound in the presence of a copper compound and a base other than cesium carbonate.

The invention further comprises a cyanate ester comprising the formula:

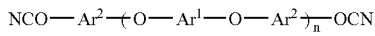

$Ar^1$ and $Ar^2$ are independently selected divalent aromatic radicals selected from the group consisting of a substituted or unsubstituted aromatic ring, substituted or unsubstituted fused aromatic rings, a substituted or unsubstituted aromatic ring assembly with or without intervening groups, and combinations thereof. The variable n is a positive integer.

The invention further comprises a process comprising the steps of: providing an oligomer comprising the formula:

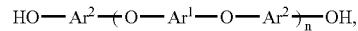

and reacting the oligomer with cyanide compound in the presence of a base to form —OCN end groups on the oligomer. $Ar^1$, $Ar^2$, and n are as defined in the previous paragraph.

The invention further comprises a thermoset comprising the formula:

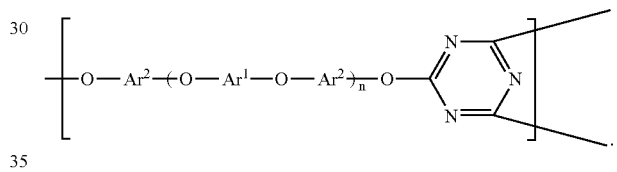

$Ar^1$, $Ar^2$, and n are as defined above.

The invention further comprises a process comprising the steps of: providing the above cyanate ester and curing the cyanate ester to a thermoset.

BRIEF DESCRIPTION OF THE DRAWINGS

A more complete appreciation of the invention will be readily obtained by reference to the following Description of the Example Embodiments and the accompanying drawings.

DETAILED DESCRIPTION OF THE EXAMPLE EMBODIMENTS

Figure 1:
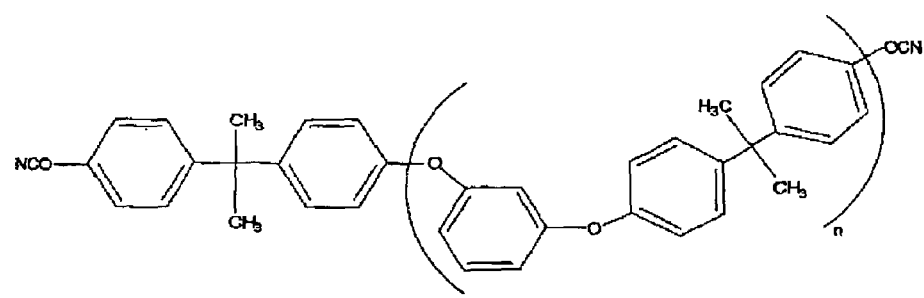
FIG. 1 shows a thermogram of the curing of bisphenol A based CE both neat and with 2% Cu (II) compound.
Figure 1:
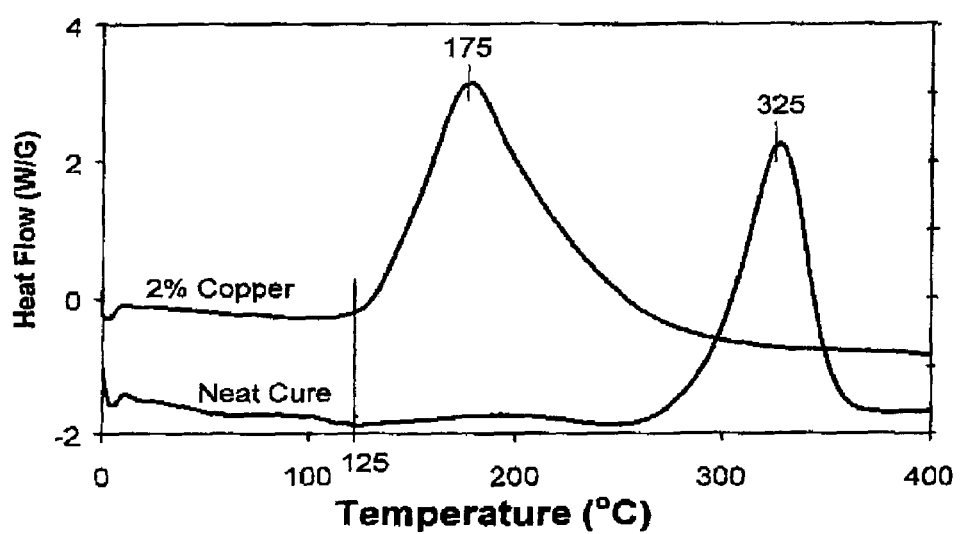

This invention is related to the synthesis and polymerization of liquid or low melting oligomeric cyanate ester monomers containing multiple aromatic ether spacers between the reactive ester groups. By incorporating oligomeric aromatic ether containing units with varying spacer length, the rigidity, cross-linking density, glass transition temperature, and mechanical properties of the resulting thermoset may be controlled. After polymerization, the CE-based thermosets can show good thermal stability as well as variable glass transition temperatures. Moreover, a synthetic method has been developed that affords CE-based thermosets that can be more flexible and can have enhanced toughness relative to previously developed resins in the field where flexibility has been difficult to achieve in highly aromatic systems. To date, most reported CE monomers are solids (mp>80° C.) and thus must melt before undergoing thermal polymerization at temperatures usually above 100° C. Therefore, liquid monomers of this invention that are curable at temperatures of 50–125° C. can be advantageous from a processing standpoint. The liquid precursor resins may be useful in composite fabrication by the various techniques typically used such as infusion molding, prepreg consolidation, and resin transfer molding. The CE resins, which may be liquid at ambient temperature and have low curing temperatures, may allow for excellent processability into shaped components.

The CE resins may be polymerized into a thermosetting polymeric matrix with variable glass transition temperatures. The cyanate ester monomer, which displays superb processability, may be readily polymerized neat or by the aid of a metal catalyst. By changing the initial reactants, thermosets possessing unique glass transition temperatures and physical and mechanical properties can be realized by the proper selection of reagents in the hydroxy terminated oligomer formation reaction.

The versatility of this reaction pathway is that any dihydroxyaromatic compound, including any bisphenol or any combination thereof and any dihaloaromatic compound, such as dibromoaromatic compound, diiodoaromatic compound, or any combination thereof can be used in the initial hydroxy terminated oligomer formation reaction. These tunable properties make these cyanate ester-based thermosets candidates for polymer membranes in fuel cells. In addition, due to their thermal stability and physical and mechanical properties, the resulting polymers have potential for a variety of applications in the aerospace, adhesive, and electronic industries. These materials may address the toughness or brittleness issue associated with current commercially available CE resins. The thermosets exhibit similar or enhanced thermal properties and improved processability relative to current systems.

The synthesis of the thermoset is performed in three steps. First, an excess of dihydroxyaromatic compound is reacted with a dihaloaromatic compound to form a dihydroxy-terminated aromatic ether oligomer. Second, the aromatic ether oligomer is reacted with a base, followed by reaction with a cyanide compound to make a cyanate ester. Third, the cyanate ester is cured to make a thermoset.

a halogen, such as bromine or iodine. The two Ys may be different.

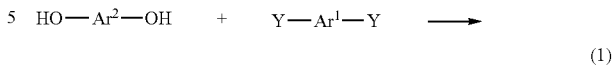

This formula shows the result when an excess of dihydroxyaromatic compound is used to make a hydroxy-terminated oligomer. The value of n is determined by the molar ratio of dihydroxyaromatic compound to dihaloaromatic. For example when the ratio is 2:1, n is 1. When the ratio is 3:2, n is 2. A suitable range for n is 1 to 10, including 2, 3, 4, 5, 6, 7, 8, and 9, however, there is no upper limit to the value of n, even if the oligomer may be considered a polymer.

Suitable $Ar^1$ groups include, but are not limited to, a phenyl, an m-phenyl, a benzophenone residue, a 4,4'-benzophenone residue, and a diphenyl sulfone residue. Suitable $Ar^2$ groups include, but are not limited to, phenyl, an m-phenyl, p-phenyl, o-phenyl, a biphenyl, a 4,4'-biphenyl, a bisphenol residue, a bisphenol A residue, a bisphenol S residue, and a bisphenol A6F residue. A residue refers to the divalent radical formed when the hydroxyl hydrogens are removed from the dihydroxyaromatic compound or the halo groups are removed from the dihaloaromatic compound.

It is to be understood that a plurality of dihydroxyaromatics and/or dihaloaromatics may be used to form the oligomer, such that there are more than one embodiment of $Ar^1$ and/or $Ar^2$ within an oligomer molecule. Further, when $Ar^1$ and/or $Ar^2$ are asymmetrical, they may be found oriented in both directions within one oligomer.

In one embodiment the oligomer is as shown in formulas (2) or (3). $Ar^3$ is defined the same as $Ar^1$ and $Ar^2$. Each X is either H or F. In some embodiments, none of the Ar groups are aromatic ring assemblies with intervening functional groups. An example of a dihydroxyaromatic compound that may be used to make this oligomer is a bisphenol. Suitable R groups include, but are not limited to, 2,2-isopropylidene and hexafluoro-2,2-isopropylidene.

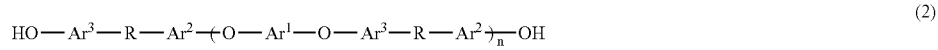

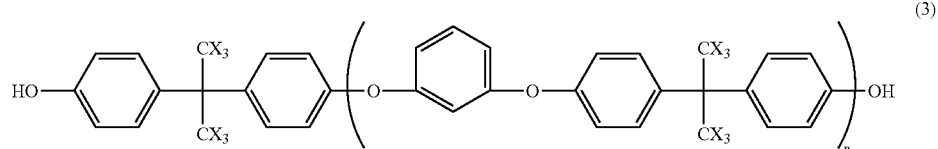

Aryl Ether Oligomer

In the first step the dihydroxyaromatic compound is reacted with the dihaloaromatic compound to form the oligomer as shown in formula (1). $Ar^1$ and $Ar^2$ are independently selected divalent aromatic radicals selected from the group consisting of a substituted or unsubstituted aromatic ring, substituted or unsubstituted fused aromatic rings, a substituted or unsubstituted aromatic ring assembly with or without intervening groups, and combinations thereof. Y is The reaction may be performed according to methods disclosed in Keller et al., U.S. patent application Ser. No. 10/135,012, filed on Apr. 26, 2002 using a copper compound and cesium carbonate. (All referenced patents and publications are incorporated herein by reference.) In one embodiment, the reaction may be performed in the presence of a copper compound and a base. Suitable bases include, but are not limited to, a carbonate, potassium carbonate, sodium bicarbonate, sodium carbonate, a strong base, potassium hydroxide, sodium hydroxide, and lithium hydroxide. The substitution of cesium carbonate by potassium carbonate in the hydroxy terminated oligomer formation reaction may be used due to the limited solubility of the cesium versus the potassium-terminated salt of the oligomer in polar aprotic solvents. Homogeneity throughout the reaction can allow for efficient formation of the hydroxy terminated oligomer from the dihydroxyaromatic and dihaloaromatic compound. The halo groups of the dihaloaromatic compound need not be activated by an electron-withdrawing group. Electron-withdrawing groups can include, but are not limited to, carbonyl and sulfone. Suitable dihydroxyaromatics include, but are not limited to, a phenyl, resorcinol, a bisphenol, bisphenol A, bisphenol S, bisphenol A6F, a dihydroxybenzene, and a dihydroxybiphenyl. Suitable copper compounds include, but are not limited to, CuI, CuBr, and CuCl. The reaction may also be catalyzed with a chelating agent such as an amine or 1,10-phenanthroline to make the reaction occur faster by solubilizing the copper salt. This catalyst can help to solubilize the copper.

Although formula (1) shows an excess of dihydroxyaromatic, any ratio of reactants may be used. However formula (1) would be followed to produce an oligomer that may be used to make a cyanate ester. A halo-terminated oligomer may be made by using an excess of dihaloaromatic compound. An aryl-terminated oligomer may also be made by using a combined excess of dihydroxyaromatic and hydroxyaromatic with dihaloaromatic or by using a combined excess of dihaloaromatic and haloaromatic with dihydroxyaromatic. A high molecular weight polymer may be made by using a 1:1 ratio of dihydroxyaromatic compound and dihaloaromatic compound.

Cyanate Ester

In the next step, the oligomer of formula (1) is reacted with a cyanide compound, such as cyanogen bromide to form a cyanate ester, as shown in formula (4). The $Ar^1$ and $Ar^2$ groups can be any divalent aromatic groups such as an aromatic ring, fused aromatic rings, an aromatic ring assembly with or without intervening groups, and combinations thereof, with the proviso that when $Ar^2$ is a bisphenol A residue and when $Ar^1$ is either a benzophenone residue or a diphenyl sulfone residue then n is from 1 to 5. The oligomer may be made by the above process or by any other process, including the use of activating groups on an aromatic group, such that the reaction may proceed without a copper compound. Potentially, the monomer can be synthesized in one reaction pot from the reaction of a metal terminated salt of the oligomer, formed originally in the initial reaction of dihydroxyaromatic compound and dihaloaromatic compound, with BrCN. The metal terminated salt of the oligomer may be formed by reaction of the oligomer with a base. The reaction can be monitored by infrared spectroscopy, observing the disappearance of the hydroxy stretch at about 3400 cm$^{-1}$ and the appearance of the cyanate ester (—OCN) functionality located at about 2276 and/or 2244 cm$^{-1}$.

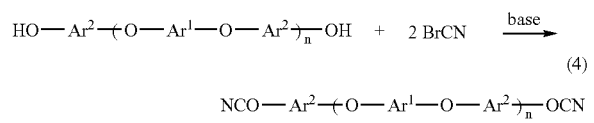

(4)

Thermoset

The cyanate ester having any $Ar^1$ and $Ar^2$ groups disclosed above may be cured to a thermoset. This can occur by cross-linking at the cyanate ester groups by cyclotrimerization as shown in formula (5). A structure of the thermoset is shown in formula (6). It is to be understood that in formula (6), the repeat unit is always oriented in the same way, that is, the O on the left is always bonded to a triazine ring and not another O. The triazine ring is always bonded to an O and not another triazine ring. It is also to be understood that, while the formula shows complete cross-linking, some cyanate ester groups may remain uncross-linked while still being a thermoset within the scope of the invention.

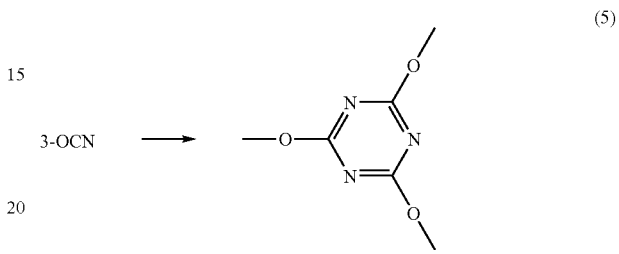

(5)

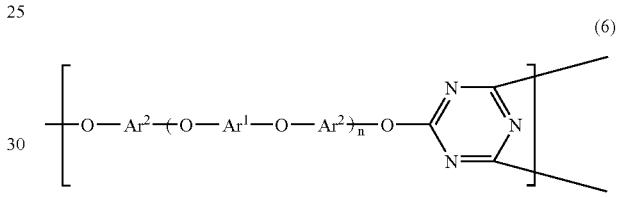

(6)

As the value of n increases, the cross-linking density of the resulting thermoset is decreased, the glass transition temperature may be lowered, and the thermoset may be much less brittle than the commercially available materials currently used in circuit board manufacturing.

The curing may be performed simply by heating the cyanate ester to an appropriate temperature. Curing may occur at a lower temperature when a curing additive, such as a metal acetylacetonate, a transition metal salt, copper (II) acetylacetonate, chromium (III) acetylacetonate, manganese (III) acetylacetonate, 1,3-bis(3-aminophenoxy)benzene, an alcohol, a phenol, or an amine is added to the cyanate ester. The curing additive can catalyze the formation of the triazine ring and lower the temperature needed for curing. The cyanate ester may also be cured with additional hydroxy terminated oligomer.

By mixing in up to 1–2 weight % or more of copper (II) acetylacetonate catalyst at 50° C., the curing temperature may be reduced by an average of 40–200° C. and the total curing time may be subsequently reduced indicated by a sharpening of the cure peak through DSC analysis. The resulting mixture may stay non-viscous until the appropriate curing temperature is reached. Since CEs exhibit little to no out-gassing during the curing process, void-free polymers or composites can be achieved with little effort. In addition, the high aromatic content of the resulting thermoset may afford a reasonable char yield (40–70%) when pyrolyzed to 1000° C. under inert conditions.

The rigidity and cross-linking density of the thermoset can be controlled. The $T_g$ and other physical properties can be directly affected. The cyanate ester can be a low melting solid and have a reduced curing temperature in the presence of a curing additive. By the addition of a smaller amount of catalyst, the cross-linking may be slowed in order to provide a longer processing window. The incorporation of —CF$_3$ moieties into the thermoset combined with the already low dielectric material properties for cyanate ester based thermosets should provided a system with a low dielectric constant, potentially useful for radome and electronics applications.

Having described the invention, the following examples are given to illustrate specific applications of the invention. These specific examples are not intended to limit the scope of the invention described in this application.

All starting compounds were of reagent grade, purchased commercially, and used without further purification. Differential scanning calorimetric analysis was preformed on a TA Instruments DSC 2920 Modulated thermal analyzer under nitrogen at a heating rate of 10° C./min. Thermogravometric analysis was preformed on a TA Instruments Simultaneous DTA-TGA at a heating rate of 10° C./min under a nitrogen purge of 100 cm$^3$/min. The glass transition temperature ($T_g$) was reported as the temperature centered at the midpoint between the linear baselines of a DSC scan. Solvent deposition of thin films of the substance onto NaCl plates was used to obtain the infrared spectra, which was recorded using a Nicolet Magna FTIR 750 spectrometer.

EXAMPLE 1

Synthesis of resorcinol based hydroxy terminated oligomer (2:1)—To a 100 mL three-neck flask fitted with a thermometer, a Dean-Stark trap with condenser, and nitrogen inlet was added resorcinol (1,3-dihydroxybenzene) (20.0 g, 181 mmol), 1,3-dibromobenzene (11.0 mL, 21.4 g, 90.8 mmol), 1,10-phenanthroline (700 mg, 6.36 mmol), and N,N-dimethylformamide (80 mL). The resulting mixture was degassed with nitrogen for 10 min followed by the addition of copper (I) bromide (540 mg, 3.76 mmol) and CsCO$_3$ (31.0 g, 95.0 mmol). After filling the Dean-Stark trap with toluene and adding 5 mL to the reaction flask, the mixture was heated to reflux at 145° C. for 1 hr. The water formed in the reaction was removed by azeotropic distillation and at this time an additional portion of CsCO$_3$ (31.0 g, 95.0 mmol) was added. The mixture was refluxed for 9–12 hr until no more water was observed being collected in the Dean-Stark trap. The remaining toluene was then removed by distillation and the reaction mixture cooled to ambient temperature. Water was added (500 mL) to the reaction mixture. At this point the mixture was slightly basic and 2 M HCl (300 mL) was added. The mixture was then extracted with ether (2×100 mL) and the combined ether layers washed with 2 M HCl (1×100 mL) and water (1×100 mL). The hydroxy terminated oligomeric intermediate was extracted into the water layer by the addition of 200 mL of 10% NaOH solution. The mixture was extracted with ether (2×100 mL) to remove impurities and the water layer was made acidic by the addition of 100 mL of 2 M HCl solution. The water was again extracted with ether (2×100 mL) and the ether layers combined. Carbon black (2 g) was added and the ether filtered through a short plug of silica gel to remove any insoluble components. The solvent was removed and the oil vacuum dried to yield the analytically pure 2:1 hydroxy terminated oligomer (19.6 g, 74%) as a red oil.

EXAMPLE 2

Synthesis of 2:1 CE resin based on resorcinol—In a 250 mL, three-neck flask was placed the 2:1 hydroxy terminated oligomer from Example 1 (4.50 g, 15.3 mmol), cyanogen bromide (3.42 g, 32.3 mmol), and dry acetone (20 mL). The reaction mixture was cooled to −10 to 0° C. and triethylamine (5.35 mL, 3.88 g, 38.4 mmol) was added drop-wise so as to keep the temperature between −10 and 0° C. Following the addition, the reaction was stirred at 0° C. for an additional 2 hr. The reaction mixture was poured into water (100 mL) and extracted with ether (2×50 mL). The ether layers were collected and immediately filtered through a short silica gel plug. The ether was removed and the resulting oil dried under vacuum to yield the 2:1 cyanate ester resin (4.29 g, 82%) as a yellow oil. IR [cm$^{-1}$]: ν 3068, 2260 (CN), 1591, 1478, 1309, 1263, 1204, 1167, 1143, 1000, 983, 851.

EXAMPLE 3

Figure 2:
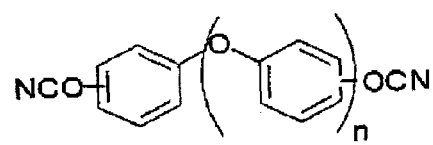
FIG. 2 shows a thermogram of the curing of resorcinol based CE both neat and with 2% Cu (II) compound.
Figure 2:
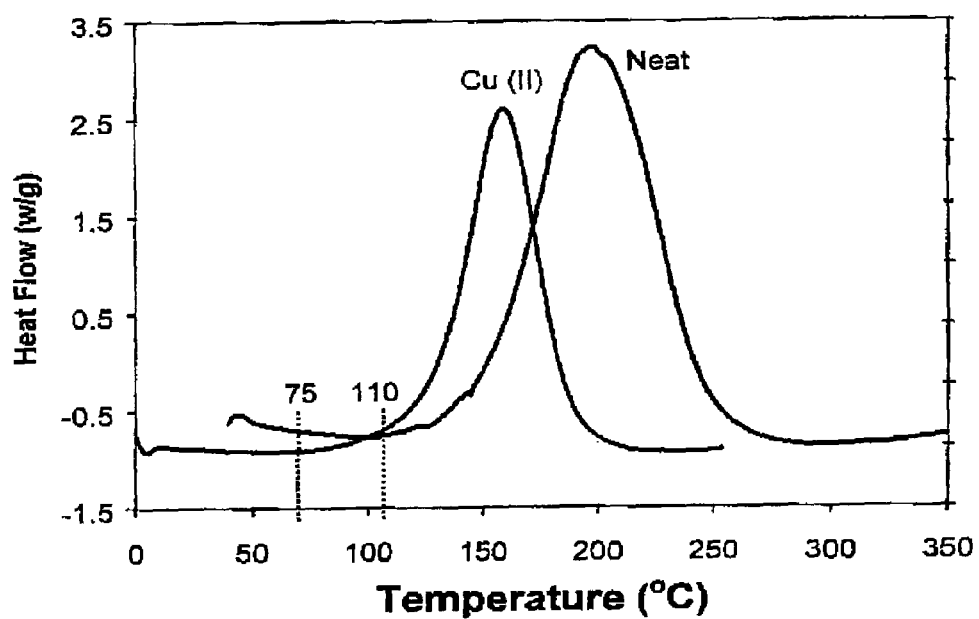

Self-curing of 2:1 CE resin—The liquid CE monomer formed in Example 2 was placed directly into the DSC pan and cured under nitrogen by heating at 135° C. for 2 hr, 150° C. for 4 hr, 175° C. for 4 hr, and 250° C. for 2 hr to afford a shaped solid. When heated at 10° C./min, the system exhibited a curing exotherm as observed from DSC analysis commencing at around 130° C. and ending at around 270° C. (see FIG. 2).

EXAMPLE 4

Copper (II) curing of 2:1 CE resin to 200° C.—To the CE oil formed in Example 2 was added Cu (II) acetylacetonate (2% by weight) with stirring at 50° C. Once the Cu (II) acetylacetonate had been evenly dispersed, the sample was cooled and used in the DSC and TGA studies. The yellowish mixture was cured by heating at 100° C. for 2 hr, 125° C. for 4 hr, 150° C. for 4 hr, and 200° C. for 2 hr to afford a shaped solid. In a separate experiment, the DSC thermogram exhibited an exotherm beginning at 95° C. and ending at around 190° C., showing that the addition of a catalytic amount of Cu (II) acetylacetonate reduced the initial curing temperature by approximately 35° C. (see FIG. 2). The thermoset exhibited a glass transition temperature at around 94° C. TGA analysis revealed that when heated under nitrogen to 1000° C. the system began to lose weight at around 300° C. with an overall char yield of around 40%.

EXAMPLE 5

Chromium (III) curing of 2:1 CE resin to 250° C.—To the oil formed in Example 2 was added 2% Cr (III) acetylacetonate with stirring at 50° C. Once the Cr (III) acetylacetonate had been evenly dispersed, the sample was cooled and used in the DSC and TGA studies. The mixture was cured by heating at 125° C. for 2 hr, 175° C. for 4 hr, 200° C. for 4 hr, and 250° C. for 2 hr to afford a shaped solid. The DSC thermogram exhibited an exotherm beginning at 100° C. and ending at around 230° C., showing that the addition of a catalytic amount of Cr (III) acetylacetonate reduced the initial curing temperature by approximately 30° C.

EXAMPLE 6

Synthesis of resorcinol based hydroxy terminated oligomer (3:2)—To a 100 mL three-neck flask fitted with a thermometer, a Dean-Stark trap with condenser, and nitrogen inlet was added resorcinol (1,3-dihydroxybenzene) (20.0 g, 181 mmol), 1,3-dibromobenzene (14.6 mL, 28.5 g, 120 mmol), 1,10-phenanthroline (700 mg, 6.36 mmol), and N,N-dimethylformamide (80 mL). The resulting mixture was degassed with nitrogen for 10 min followed by the addition of copper (I) bromide (540 mg, 3.76 mmol) and CsCO$_3$ (31.0 g, 95.0 mmol). After filling the Dean-Stark trap with toluene and adding 5 mL to the reaction flask, the reaction mixture was heated to reflux at 145° C. for 1 hr. The water formed in the reaction was removed by azeotropic distillation. At this time, an additional portion of CsCO$_3$ (31.0 g, 95.0 mmol) was added. The mixture was refluxed for 9–12 hr until no more water was observed being collected in the Dean-Stark trap. The remaining toluene was then removed by distillation and the reaction mixture cooled to ambient temperature. Water was added (500 mL) to the reaction mixture. At this point, the mixture was slightly basic and 2 M HCl (300 mL) was added. The mixture was then extracted with ether (2×100 mL) and the combined ether layers washed with 2 M HCl (1×100 mL) and water (1×100 mL). The hydroxy terminated oligomeric intermediate was extracted into the water layer by addition of 200 mL of 10% NaOH solution. The aqueous solution was then extracted with ether (2×100 mL) to remove impurities. The aqueous solution was then made acidic by the addition of 100 mL of 2 M HCl solution resulting in the precipitation of an oil. The resulting mixture was extracted with ether (2×100 mL) and the ether layers combined. Carbon black (2 g) was added and the ether filtered through a short plug of silica gel to remove any insoluble components. The ether was removed and the oil vacuum dried to yield the analytically pure 3:2 hydroxy terminated oligomer (25.5 g, 89%) as a red oil.

EXAMPLE 7

Synthesis of 3:2 CE resin based on resorcinol—In a 250 mL, three-neck flask was placed the 3:2 hydroxy terminated oligomer from Example 6 (1.97 g, 4.12 mmol), cyanogen bromide (830 mg, 7.84 mmol), and dry acetone (20 mL). The reaction mixture was cooled to −10 to 0° C. and triethylamine (1.40 mL, 1.02 g, 10.0 mmol) was added drop-wise so as to keep the temperature between −10 and 0° C. Following the addition, the reaction was stirred at 0° C. for an additional 2 hr. The mixture was poured into water (100 mL) and the water extracted with ether (2×50 mL). The ether layers were collected and immediately filtered through a short silica gel plug. The solvent was removed and the resulting oil dried under vacuum to yield the 3:2 cyanate ester (CE) resin (1.84 g, 83%) as a yellow oil. IR [cm$^{-1}$]: ν 3068, 2260 (CN), 1589, 1476, 1308, 1263, 1211, 1168, 1144, 1077, 986, 853.

EXAMPLE 8

Self-curing of 3:2 CE resin—The liquid CE monomer formed in Example 7 was placed directly into the DSC pan and cured under nitrogen by heating at 150° C. for 2 hr, 200° C. for 4 hr, 225° C. for 4 hr and 250° C. for 2 hr. In a separate experiment, the system exhibited a curing exotherm as observed from DSC analysis commencing at around 125° C. and ending at around 270° C.

EXAMPLE 9

Copper (II) curing of 3:2 CE resin to 250° C.—To the CE monomer formed in Example 7 was added Cu (II) acetylacetonate (2% by weight) with stirring at 50° C. Once the Cu (II) acetylacetonate had been evenly dispersed, the sample was cooled and used in the DSC and TGA studies. The yellowish mixture was cured by heating at 125° C. for 2 hr, 150° C. for 4 hr, 200° C. for 4 hr and 250° C. for 2 hr to afford a solid film. The DSC exhibited an exotherm beginning at 100° C. and ending at around 225° C., showing that the addition of a catalytic amount of Cu (II) acetylacetonate reduced the initial curing temperature by approximately 25° C. The thermoset exhibited a glass transition temperature at around 83° C. TGA analysis revealed that when heated under nitrogen to 1000° C. the system began to lose weight at around 320° C. with an overall char yield of around 40%.

EXAMPLE 10

Copper (II) curing of 3:2 CE resin to 250° C.—To the CE monomer formed in Example 7 was added Cu (II) acetylacetonate (1% by weight) with stirring at 50° C. Once the Cu (II) acetylacetonate had been evenly dispersed, the sample was cooled and used in the DSC studies. The yellowish mixture was cured by heating at 125° C. for 2 hr, 150° C. for 4 hr, 200° C. for 4 hr and 250° C. for 2 hr to afford solid film. A separated DSC thermogram exhibited an exotherm beginning at 100° C. and ending at around 225° C.

EXAMPLE 11

1,3-Bis(3-aminophenoxy)benzene (m-APB) curing of 3:2 CE resin to 300° C.—To the CE oil synthesized in Example 7 was added 5 weight % of m-APB with stirring at 110° C. Once the APB was melted into the sample, it was cooled and used in the DSC and TGA studies. The mixture was cured by heating at 100° C. for 1 hr, 150° C. for 1 hr, 250° C. for 2 hr and 300° C. for 1 hr resulting in a shaped solid. The DSC thermogram exhibited an exotherm beginning at 60° C. and ending at around 220° C. It was shown that 5% by weight of m-APB was necessary to shift the curing exotherm by approximately 65° C. to a lower temperature cure. The thermoset, once fully cured, exhibited a glass transition temperature at around 67° C. TGA analysis revealed that when heated under nitrogen to 1000° C., the system began to lose weight at around 300° C. with an overall char yield of around 40%.

EXAMPLE 12 m-APB curing of 3:2 CE resin to 300° C.—To the CE oil synthesized in Example 7 was added 2 weight % of m-APB with stirring at 110° C. Once the APB was melted into the sample, it was cooled and used in the DSC and TGA studies. The mixture was cured by heating at 100° C. for 1 hr, 150° C. for 1 hr, 250° C. for 2 hr and 300° C. for 1 hr resulting in a solid film. The DSC thermogram exhibited two exotherms beginning at 60° C. and ending at around 300° C. TGA analysis reveals that when heated under nitrogen to 1000° C., the system began to lose weight at around 300° C. with an overall char yield of around 40%.

EXAMPLE 13

Curing of 3:2 CE resin with 3:2 hydroxy terminated oligomeric aromatic ether From Example 6 to 250° C.—To the CE oil synthesized in Example 7 was added the oil from Example 6 in a 1:1 ratio at 50° C. with stirring. The sample was cooled and used in the DSC and TGA studies. The mixture was cured at the following temperatures and times: 100° C. for 1 hr, 150° C. for 2 hr and 250° C. for 2 hr. The DSC exhibited a broad exotherm beginning at 50° C. and ending at around 150° C. TGA analysis revealed that when heated under nitrogen to 1000° C. the system began to lose weight at around 290° C. with an overall char yield of around 20%.

EXAMPLE 14

Synthesis of 2:1 hydroxy terminated oligomer based on bisphenol A and 1,3-dibromobenzene—To a 100 mL three neck flask fitted with a thermometer, a Dean-Stark trap with condenser, and nitrogen inlet was added bisphenol A (10.0 g, 43.8 mmol), 1,3-dibromobenzene (2.64 mL, 5.16 g, 21.9 mmol), 1,10-phenanthroline (350 mg, 1.94 mmol) and N,N-dimethylformamide (50 mL). The resulting mixture was degassed with nitrogen for 10 min followed by the addition of copper (I) (420 mg, 2.94 mmol) and $CsCO_3$ (7.80 g, 23.9 mmol). After filling the Dean-Stark trap with toluene and adding 5 mL to the reaction flask, the mixture was heated to reflux at 145° C. for 1 hr. The water formed in the reaction was removed by azeotropic distillation and at this time an additional portion of $CsCO_3$ (7.80 g, 23.9 mmol) was added. The mixture was refluxed for 9–12 hr until no more water was observed being collected in the Dean-Stark trap. The remaining toluene was then removed by distillation and the reaction mixture cooled to ambient temperature. Water was added (500 mL) to the reaction mixture. At this point the mixture was slightly basic and 2 M HCl (300 mL) was added. The mixture was then extracted with ether (2×100 mL) and the combined ether layers washed with 2 M HCl (1×100 mL) and water (1×100 mL). The hydroxy terminated oligomeric intermediate was extracted into the water layer by addition of 200 mL of 10% NaOH solution. The mixture was then extracted with ether (2×100 mL) to remove impurities and the water layer was made acidic by the addition of 100 mL of 2 M HCl solution. The aqueous solution was again extracted with ether (2×100 mL) and the ether layers combined. Carbon black (2 g) was added and the ether filtered through a short plug of silica gel to remove any insoluble components. The solvent was removed and the oil vacuum dried to yield the analytically pure 2:1 hydroxy terminated oligomer (9.18 g, 80%) of an amber solid.

EXAMPLE 15

Synthesis of 2:1 CE resin based on bisphenol A and 1,3-dibromobenzene—In a 250 mL, three-neck flask was placed the 2:1 hydroxy terminated oligomer from Example 14 (1.62 g, 3.05 mmol), cyanogen bromide (710 mg, 6.70 mmol), and dry acetone (10 mL). The reaction mixture was cooled to −10 to 0° C. and triethylamine (0.95 mL, 690 mg, 6.82 mmol) was added dropwise so as to keep the temperature between −10–0° C. Following the addition, the reaction was stirred at 0° C. for an additional 2 hr. The mixture was poured onto water (100 mL) and the water extracted with ether (2×50 mL). The ether layers were collected and immediately filtered through a short silica gel plug. The solvent was removed and the resulting oil dried under vacuum to yield the 2:1 bisphenol A based CE resin (1.62 g, 91%) as a yellow oil. IR [$cm^{-1}$]: v 3060, 2969, 2270 (CN), 2236 (CN), 1591, 1502, 1478, 1222, 1171, 1013, 968, 833.

EXAMPLE 16

Self-curing of 2:1 CE resin based on bisphenol A and 1,3-dibromobenzene—The liquid CE monomer formed in Example 15 was placed directly into the DSC pan and cured under nitrogen at the following temperature and time: 275° C. for 2 hr, 300° C. for 4 hr, 325° C. for 4 hr, 350° C. for 2 hr, and 375° C. for 2 hr. In a separate experiment, the system exhibited a curing exotherm as observed from DSC analysis commencing at around 260° C. and ending at around 370° C. (see FIG. 1).

EXAMPLE 17

Copper (II) acetylacetonate curing of 2:1 CE resin based on bisphenol A and 1,3-dibromobenzene to 350° C.—To the solid CE resin synthesized in Example 15 was added the Cu (II) acetylacetonate (2% by weight) at 50° C. Once the Cu (II) acetylacetonate had been evenly dispersed the sample was cooled and used in the DSC and TGA studies. The yellowish mixture was cured by heating at 125° C. for 1 h, 150° C. for 2 h, 200° C. for 2 h, 300° C. for 2 h and 350° C. for 1 h. The DSC thermogram of the mixture exhibited an exotherm beginning at 60° C. and ending at around 140° C., showing that the addition of a catalytic amount of Cu (II) acetylacetonate reduced the initial curing temperature by approximately 200° C. The thermoset exhibited a glass transition temperature at around 210° C. TGA analysis revealed that when heating under nitrogen to 1000° C. the system began to lose weight at around 400° C. with an overall char yield of around 38%.

EXAMPLE 18

1% copper (II) curing of 2:1 CE resin based on bisphenol A and 1,3-dibromobenzene—To the oil in example 15 was added the Cu (II) acetylacetonate (1% by weight) with stirring at 50° C. Once the Cu (II) acetylacetonate had been evenly dispersed, the sample was cooled and used in the DSC and TGA studies. The DSC exhibited two exotherms the first beginning at 140° C. and ending at around 200° C. and the second beginning at 210° C. and ending at around 350° C., showing that the addition of a lower catalytic amount of Cu (II) did not fully reduce the initial curing temperature.

EXAMPLE 19

Synthesis of 2:1 hydroxy terminated oligomer based on bisphenol A6F and 4,4'-difluorobenzophenone—To a 250 mL three neck flask fitted with a thermometer, Dean-Stark trap with condenser, and nitrogen inlet was added bisphenol A6F (10.0 g, 29.7 mmol), 4,4'-difluorobenzophenone (3.24 g, 15.1 mmol), powdered $K_2CO_3$ (8.20 g, 59.4 mmol) and N,N-dimethylformamide (50 mL). After filling the Dean-Stark trap with toluene and adding 5 mL to the reaction flask, the mixture was heated to reflux at 145° C. The water formed in the reaction was removed by azeotropic distillation. The mixture was refluxed for 9–12 hr until no more water was observed being collected in the Dean-Stark trap. The remaining toluene was then removed by distillation and the reaction mixture cooled to ambient temperature. Water was added (300 mL) to the reaction mixture. At this point, the mixture was slightly basic and 2 M HCl (200 mL) was added. The mixture was then extracted with ether (2×50 mL) and the combined ether layers washed with 2 M HCl (1×100 mL) and water (1×100 mL). The hydroxy terminated oligomeric intermediate was extracted into the water layer by addition of 200 mL of 10% NaOH solution. The aqueous solution was extracted with ether (2×100 mL) to remove impurities and the water layer made acidic by the addition of 100 mL of 2 M HCl solution. The resulting mixture was extracted again with ether (2×100 mL) and the ether layers combined. Carbon black (2 g) was added and the ether filtered through a short plug of silica gel to remove any insoluble components. The solvent was removed and the oil vacuum dried to yield the analytically pure 2:1 hydroxy terminated oligomer (12.2 g, 96%) as a white solid.

EXAMPLE 20

Synthesis of 2:1 CE resin based on bisphenol A6F and 4,4'-difluorobenzophenone—The 2:1 hydroxy terminated oligomer (9.98 g, 11.7 mmol) from Example 19 was transferred to a 50 mL three-neck flask fitted with a thermometer. Cyanogen bromide (2.61 g, 24.64 mmol) and dry acetone (10 mL) were added under nitrogen. The resulting mixture was cooled to between −10 and 0° C. and triethylamine (3.6 mL, 2.61 g, 25.8 mmol) dissolved in 3 mL acetone was added drop-wise so as to keep the temperature of the reaction mixture between −10 and 0° C. After the addition, the reaction was stirred below 0° C. for an additional 1 hr. Water (100 mL) was added and the reaction mixture extracted with ether (2×100 mL). The ether layers were collected, washed with 1% NaCl (aq.) (100 mL) and 10% $K_2CO_3$ (aq.) (100 mL), separated, then filtered through a short silica plug, and the solvent removed. Following vacuum drying the 2:1 oligomeric CE (9.70 g, 92%) was isolated as a white solid, m.p. 128° C. IR [$cm^{-1}$]: v 3071, 2276 (CN), 2244 (CN), 1653, 1595, 1504, 1246, 1212, 1177, 968, 928, 831.

EXAMPLE 21

Self-curing of 2:1 oligomeric CE based on bisphenol A6F and 4,4'-difluorobenzophenone—The solid CE monomer synthesized in Example 20 was placed directly into the DSC pan and cured under nitrogen by heating at 250° C. for 2 hr, 300° C. for 4 hr, 325° C. for 4 hr, and 375° C. for 2 hr. In a separate experiment, the system exhibited a curing exotherm as observed from DSC analysis commencing at around 225° C. and ending at around 360° C.

EXAMPLE 22

Copper (II) curing of 2:1 oligomeric CE based on bisphenol A6F and 4,4'-difluorobenzophenone to 275° C.—To the solid CE resin synthesized in Example 20 was added the Cu (II) acetylacetonate (2% by weight) at 50° C. Once the Cu (II) acetylacetonate had been evenly dispersed the sample was cooled and used in the DSC and TGA studies. The yellowish mixture was cured by heating at 125° C. for 2 hr, 175° C. for 4 hr, 225° C. for 4 hr, and 275° C. for 2 hr. The DSC thermogram of the mixture exhibited a melting point at 108° C. followed by an exotherm beginning at 115° C. and ending at around 275° C., showing that the addition of a catalytic amount of Cu (II) acetylacetonate reduced the initial curing temperature by approximately 110° C. The thermoset exhibited a glass transition temperature at around 190° C. TGA analysis revealed that when heated under nitrogen to 1000° C. the system began to lose weight at around 400° C. with an overall char yield of around 50%.

EXAMPLE 23

Copper (II) curing of 2:1 oligomeric CE based on bisphenol A6F and 4,4'-difluorobenzophenone to 275° C.—To the solid CE resin synthesized in Example 20 was added the Cu (II) acetylacetonate (1% by weight) at 50° C. Once the Cu (II) acetylacetonate had been evenly dispersed the sample was cooled and used in the DSC and TGA studies. The yellowish mixture was cured by heating at 125° C. for 2 hr, 175° C. for 4 hr, 225° C. for 4 hr, and 275° C. for 2 hr. The DSC thermogram of the mixture exhibited a melting point at 108° C. followed by an exotherm beginning at 115° C. and ending at around 275° C., showing that the addition of a catalytic amount of Cu (II) acetylacetonate reduced the initial curing temperature by approximately 110° C. The thermoset, once fully cured, exhibited a glass transition temperature at around 190° C. TGA analysis revealed that when heated under nitrogen to 1000° C. the system began to lose weight at around 400° C. with an overall char yield of around 50%.

EXAMPLE 24

Synthesis of 2:1 hydroxy terminated oligomer based on bisphenol A and 4,4'-difluorobenzophenone—To a 250 mL three neck flask fitted with a thermometer, Dean-Stark trap with condenser, and nitrogen inlet was added bisphenol A (20.0 g, 87.6 mmol), 4,4'-difluorobenzophenone (9.56 g, 43.8 mmol), powdered $K_2CO_3$ (24.2 g, 175 mmol) and N,N-dimethylformamide (100 mL). After filling the Dean-Stark trap with toluene and adding 5 mL to the reaction flask, the mixture was heated to reflux at 145° C. The water formed in the reaction was removed by azeotropic distillation. The mixture was refluxed for 9–12 hr until no more water was observed being collected in the Dean-Stark trap. The remaining toluene was then removed by distillation and the reaction mixture cooled to ambient temperature. The reaction mixture was poured into 300 mL of a 10% NaOH solution. The aqueous solution was extracted with ether (2×100 mL) to remove impurities and the water layer made acidic by the addition of 100 mL of 2 M HCl solution. The resulting mixture was extracted again with ether (2×100 mL) and the ether layers combined. Carbon black (2 g) was added and the ether filtered through a short plug of silica gel to remove any insoluble components. The solvent was removed and the oil vacuum dried to yield the analytically pure 2:1 hydroxy terminated oligomer (23.9 g, 86%) as a yellow crystalline solid.

EXAMPLE 25

Synthesis of 2:1 CE resin based on bisphenol A and 4,4'-difluorobenzophenone—The 2:1 hydroxy terminated oligomer (10.0 g, 15.8 mmol) from Example 24 was transferred to a 50 mL three-neck flask fitted with a thermometer. Cyanogen bromide (3.67 g, 34.7 mmol) and dry acetone (10 mL) were added under nitrogen. The resulting mixture was cooled to between −10 and 0° C. and triethylamine (3.6 mL, 2.61 g, 25.8 mmol) dissolved in 3 mL acetone was added drop-wise so as to keep the temperature of the reaction mixture between −10 and 0° C. After the addition, the reaction was stirred below 0° C. for an additional 1 hr. Water (100 mL) was added and the reaction mixture extracted with ether (2×100 mL). The ether layers were collected, washed with 1% NaCl (aq.) (100 mL) and 10% $K_2CO_3$ (aq.) (100 mL), separated, then filtered through a short silica plug, and the solvent removed. Following vacuum drying the 2:1 oligomeric CE (10.25 g, 95%) was isolated as a white solid, m.p. 128° C. IR [$cm^{-1}$]: v 3071, 2276 (CN), 2244 (CN), 1653, 1595, 1504, 1246, 1212, 1177, 968, 928, 831.

EXAMPLE 26

Self-curing of 2:1 oligomeric CE based on bisphenol A and 4,4'-difluorobenzophenone—The solid CE monomer synthesized in Example 24 was placed directly into the DSC pan and cured under nitrogen by heating at 250° C. for 2 hr, 300° C. for 4 hr, 325° C. for 4 hr, and 375° C. for 2 hr. In a separate experiment, the system exhibited a curing exotherm as observed from DSC analysis commencing at around 235° C. and ending at around 350° C.

EXAMPLE 27

Copper (II) curing of 2:1 oligomeric CE based on bisphenol A and 4,4'-difluorobenzophenone to 275° C.—To the solid CE resin synthesized in Example 24 was added the Cu (II) acetylacetonate (2% by weight) at 50° C. Once the Cu (II) acetylacetonate had been evenly dispersed the sample was cooled and used in the DSC and TGA studies. The yellowish mixture was cured by heating at 125° C. for 2 hr, 175° C. for 4 hr, 225° C. for 4 hr, and 275° C. for 2 hr. The DSC thermogram of the mixture exhibited a melting point at 108° C. followed by an exotherm beginning at 135° C. and ending at around 255° C., showing that the addition of a catalytic amount of Cu (II) acetylacetonate reduced the initial curing temperature by approximately 110° C. The thermoset, once fully cured, exhibited a glass transition temperature at around 200° C. TGA analysis revealed that when heating under nitrogen to 1000° C. the system began to lose weight at around 400° C. with an overall char yield of around 55%.

EXAMPLE 28

Copper (II) curing of 2:1 oligomeric CE based on bisphenol A and 4,4'-difluorobenzophenone to 275° C.—To the solid CE resin synthesized in Example 24 was added the Cu (II) acetylacetonate (1% by weight) at 50° C. Once the Cu (II) acetylacetonate had been evenly dispersed the sample was cooled and used in the DSC and TGA studies. The yellowish mixture was cured by heating at 125° C. for 2 hr, 175° C. for 4 hr, 225° C. for 4 hr, and 275° C. for 2 hr. The DSC thermogram of the mixture exhibited a melting point at 108° C. followed by an exotherm beginning at 115° C. and ending at around 275° C., showing that the addition of a catalytic amount of Cu (II) acetylacetonate reduced the initial curing temperature by approximately 110° C. The thermoset, once fully cured, exhibited a glass transition temperature at around 200° C. TGA analysis revealed that when heated under nitrogen to 1000° C. the system began to lose weight at around 400° C. with an overall char yield of around 55%.

EXAMPLE 29

Synthesis of 2:1 hydroxy terminated oligomer based on bisphenol A and 1,3-dibromobenzene using $K_2CO_3$—To a 250 mL three neck flask fitted with a thermometer, a Dean-Stark trap with condenser, and nitrogen inlet was added bisphenol A (10.0 g, 43.8 mmol), 1,3-dibromobenzene (5.16 g, 21.9 mmol), 1,10-phenanthroline (350 mg, 1.94 mmol), toluene (5 mL), and N,N-dimethylformamide (80 mL). The resulting mixture was degassed thoroughly with nitrogen for 10 min followed by the addition of copper (I) iodide (330 mg, 1.74 mmol). After filling the Dean-Stark trap with toluene the mixture was heated to reflux at 145° C. for 30 min to 1 hr in order to completely dissolve all the starting materials and remove any residual water contained in the solvent. At this time, the mixture was removed from the heat source. When the temperature reached below 120° C., $K_2CO_3$ (4.5 g, 32.6 mmol) was added in one portion and the mixture brought to reflux at 145° C. for 2 to 4 hours. The water formed in the reaction was removed by azeotropic distillation. At this time, an additional portion of $K_2CO_3$ (4.5 g, 32.6 mmol) was added. The mixture was refluxed for an additional 9–12 hr until no more water was observed being collected in the Dean-Stark trap. The remaining toluene was then removed by distillation and the reaction mixture cooled to ambient temperature. Water was added (300 mL) to the reaction mixture. At this point, the mixture was slightly basic and 2 M HCl (300 mL) was added. The mixture was then extracted with ether (2×100 mL). The combined ether layers were washed in sequence with 2 M HCl (1×100 mL) and water (1×100 mL). Carbon black (2 g) was added and the ether filtered through a short plug of silica gel to remove any insoluble components. The solvent was removed and the oil vacuum dried to yield the analytically pure 2:1 hydroxy terminated oligomer (10.33 g, 90%) as an amber solid. IR[$cm^{-1}$]: v 3392, 3033, 2968, 1591, 1504, 1478, 1363, 1266, 1220, 1176, 1125, 1081, 1013, 968, 831.

EXAMPLE 30

Synthesis of 2:1 hydroxy terminated oligomer based on bisphenol A6F and 1,3-dibromobenzene using $K_2CO_3$—To a 250 mL three neck flask fitted with a thermometer, a Dean-Stark trap with condenser, and nitrogen inlet was added bisphenol A6F (15.0 g, 44.6 mmol), 1,3-dibromobenzene (5.29 g, 22.4 mmol), 1,10-phenanthroline (350 mg, 1.94 mmol), toluene (10 mL), and N,N-dimethylformamide (80 mL). The resulting mixture was degassed thoroughly with nitrogen for 10 min followed by the addition of copper (I) iodide (350 mg, 1.84 mmol). After filling the Dean-Stark trap with toluene, the mixture was heated to reflux at 145° C. for 30 min to 1 hr in order to completely dissolve all the starting materials and remove any residual water contained in the solvent. At this time, the mixture was removed from the heat source. When the temperature reached below 120° C., $K_2CO_3$ (4.6 g, 33.3 mmol) was added in one portion and the mixture brought to reflux at 145° C. for 2 to 4 hours. The water formed in the reaction was removed by azeotropic distillation. At this time, an additional portion of $K_2CO_3$ (4.6 g, 33.3 mmol) was added. The mixture was refluxed for an additional 9–12 hr until no more water was observed being collected in the Dean-Stark trap. The remaining toluene was then removed by distillation and the reaction mixture cooled to ambient temperature. Water was added (500 mL) to the reaction mixture. At this point, the mixture was slightly basic and 2 M HCl (300 mL) was added. The mixture was then extracted with ether (2×100 mL). The combined ether layers were washed in sequence with 2 M HCl (1×100 mL) and water (1×100 mL). Carbon black (2 g) was added and the ether filtered through a short plug of silica gel to remove any insoluble components. The solvent was removed and the oil vacuum dried to yield the analytically pure 2:1 hydroxy terminated oligomer (16.1 g, 97%) as a pale yellow solid. IR [$^{-1}$]: v 3418, 1614, 1595, 1509, 1480, 1242, 1206, 1172, 1133, 1017, 968, 953, 928, 830.

EXAMPLE 31

Synthesis of 2:1 hydroxy terminated oligomer based on 4,4'-dihydroxybiphenyl and 1,3-dibromobenzene using $K_2CO_3$—To a 250 mL three neck flask fitted with a thermometer, a Dean-Stark trap with condenser, and nitrogen inlet was added 4,4'-dihydroxybiphenyl (10.0 g, 53.7 mmol), 1,3-dibromobenzene (6.33 g, 26.8 mmol), 1,10-phenanthroline (388 mg, 2.14 mmol), toluene (5 mL), and N,N- dimethylformamide (100 mL). The resulting mixture was degassed thoroughly with nitrogen for 10 min followed by the addition of copper (I) iodide (400 mg, 2.10 mmol). After filling the Dean-Stark trap with toluene, the mixture was heated to reflux at 145° C. for 30 min to 1 hr in order to completely dissolve all the starting materials and remove any residual water contained in the solvent. At this time, the mixture was removed from the heat source. When the temperature reached below 120° C., $K_2CO_3$ (5.6 g, 40.6 mmol) was added in one portion and the mixture brought to reflux at 145° C. for 2 to 4 hours. The water formed in the reaction was removed by azeotropic distillation. At this time, an additional portion of $K_2CO_3$ (5.6 g, 40.6 mmol) was added. The mixture was refluxed for an additional 9–12 hr until no more water was observed being collected in the Dean-Stark trap. The remaining toluene was then removed by distillation and the reaction mixture cooled to ambient temperature. Water was added (300 mL) to the reaction mixture. At this point, the mixture was slightly basic and 2 M HCl (300 mL) was added. The mixture was then extracted with ether (2×100 mL). The combined ether layers were washed in sequence with 2 M HCl (1×100 mL) and water (1×100 mL). Carbon black (2 g) was added and the ether filtered through a short plug of silica gel to remove any insoluble components. The solvent was removed and the oil vacuum dried to yield the analytically pure 2:1 hydroxy terminated oligomer (10.04 g, 84%) as a gray solid. IR [cm$^{-1}$]: v 3392, 3030, 1589, 1488, 1229, 1167, 870, 822.

EXAMPLE 32

Synthesis of 2:1 hydroxy terminated oligomer based on resorcinol and 1,3-dibromobenzene using $K_2CO_3$—To a 250 mL three neck flask fitted with a thermometer, a Dean-Stark trap with condenser, and nitrogen inlet was added resorcinol (10.0 g, 90.8 mmol), 1,3-dibromobenzene (10.71 g, 45.4 mmol), 1,10-phenanthroline (350 mg, 1.94 mmol), toluene (5 mL), and N,N-dimethylformamide (80 mL). The resulting mixture was degassed thoroughly with nitrogen for 10 min followed by the addition of copper (I) iodide (200 mg, 1.05 mmol). After filling the Dean-Stark trap with toluene, the mixture was heated to reflux at 145° C. for 30 min to 1 hr in order to completely dissolve all the starting materials and remove any residual water contained in the solvent. At this time, the mixture was removed from the heat source. When the temperature reached below 120° C., $K_2CO_3$ (7.0 g, 50.7 mmol) was added in one portion and the mixture brought to reflux at 145° C. for 2 to 4 hours. The water formed in the reaction was removed by azeotropic distillation. At this time, an additional portion of $K_2CO_3$ (7.0 g, 50.7 mmol) was added. The mixture was refluxed for an additional 9–12 hr until no more water was observed being collected in the Dean-Stark trap. The remaining toluene was then removed by distillation and the reaction mixture cooled to ambient temperature. Water was added (400 mL) to the reaction mixture. At this point, the mixture was slightly basic and 2 M HCl (300 mL) was added. The mixture was then extracted with ether (2×100 mL). The combined ether layers were washed in sequence with 2 M HCl (1×100 mL) and water (1×100 mL). Carbon black (2 g) was added and the ether filtered through a short plug of silica gel to remove any insoluble components. The solvent was removed and the oil vacuum dried to yield the analytically pure 2:1 hydroxy terminated oligomer (21.5 g, 88%) as a red oil. IR [cm$^{-1}$]: v 3425, 3062, 1591, 1477, 1274, 1211, 1170, 1143, 985, 964, 890, 770, 684.

EXAMPLE 33

Synthesis of 3:2 phenyl terminated oligomer based on resorcinol and 1,3-dibromobenzene using $K_2CO_3$ and phenol—To a 250 mL three neck flask fitted with a thermometer, a Dean-Stark trap with condenser, and nitrogen inlet was added resorcinol (7.0 g, 65.6 mmol), 1,3-dibromobenzene (22.5 g, 95.4 mmol), 1,10-phenanthroline (245 mg, 1.36 mmol), toluene (5 mL), and N,N-dimethylformamide (50 mL). The resulting mixture was degassed thoroughly with nitrogen for 10 min followed by the addition of copper (I) iodide (200 mg, 1.05 mmol). After filling the Dean-Stark trap with toluene the mixture was heated to reflux at 145° C. for 30 min to 1 hr in order to completely dissolve all the starting materials and remove any residual water contained in the solvent. At this time the mixture was removed from the heat. When the temperature reached below 120° C., $K_2CO_3$ (6.60 g, 47.8 mmol) was added in one portion and the mixture brought to reflux at 145° C. for 2 to 4 hours. The water formed in the reaction was removed by azeotropic distillation and at this time an additional portion of $K_2CO_3$ (6.60 g, 47.8 mmol) was added. The mixture was refluxed for an additional 9–12 hr until no more water was observed being collected in the Dean-Stark trap. At this point the mixture was removed from the heat, phenol (6.57 g, 69.8 mmol) and $K_2CO_3$ (11.6 g, 83.8 mmol) were added and the mixture refluxed at 145° C. for an additional 8 hr or until no more water was visible being collected in the Dean-Stark trap. The remaining toluene was then removed by distillation and the reaction mixture cooled to ambient temperature. Water was added (400 mL) to the reaction mixture. At this point the mixture was slightly basic and 2 M HCl (300 mL) was added. The mixture was then extracted with ether (2×100 mL) and the combined ether layers washed with 2 M HCl (1×100 mL) and water (1×100 mL). Carbon black (2 g) was added and the ether filtered through a short plug of silica gel to remove any insoluble components. The solvent was removed and the oil vacuum dried to 200° C. to yield the pure 3:2 phenyl terminated oligomeric oil (11.3, 80%).

EXAMPLE 34

Synthesis of 5:4 phenyl terminated oligomer based on resorcinol and 1,3-dibromobenzene using $K_2CO_3$ and phenol—To a 250 mL three neck flask fitted with a thermometer, a Dean-Stark trap with condenser, and nitrogen inlet was added resorcinol (7.0 g, 63.3 mmol), 1,3-dibromobenzene (18.8 g, 79.1 mmol), 1,10-phenanthroline (245 mg, 1.36 mmol), toluene (5 mL), and N,N-dimethylformamide (50 mL). The resulting mixture was degassed thoroughly with nitrogen for 10 min followed by the addition of copper (I) iodide (200 mg, 1.05 mmol). After filling the Dean-Stark trap with toluene the mixture was heated to reflux at 145° C. for 30 min to 1 hr in order to completely dissolve all the starting materials and remove any residual water contained in the solvent. At this time the mixture was removed from the heat and when the temperature reached below 120° C., $K_2CO_3$ (6.60 g, 47.8 mmol) was added in one portion and the mixture brought to reflux at 145° C. for 2 to 4 hours. The water formed in the reaction was removed by azeotropic distillation and at this time an additional portion of $K_2CO_3$ (6.60 g, 47.8 mmol) was added. The mixture was refluxed for an additional 9–12 hr until no more water was observed being collected in the Dean-Stark trap. At this point the mixture was removed from the heat, phenol (3.00 g, 31.9 mmol) and $K_2CO_3$ (5.28 g, 38.2 mmol) were added and the mixture refluxed at 145° C. for an additional 8 hr or until no more water was visible being collected in the Dean-Stark trap. The remaining toluene was then removed by distillation and the reaction mixture cooled to ambient temperature. Water was added (400 mL) to the reaction mixture. At this point the mixture was slightly basic and 2 M HCl (300 mL) was added. The mixture was then extracted with ether (2×100 mL) and the combined ether layers washed with 2 M HCl (1×100 mL) and water (1×100 mL). Carbon black (2 g) was added and the ether filtered through a short plug of silica gel to remove any insoluble components. The solvent was removed and the oil vacuum dried to 200° C. to yield the pure 5:4 phenyl terminated oligomeric oil (9.54, 76%).

EXAMPLE 35

Synthesis of 2:1 CE resin based on bisphenol A6F and 1,3-dibromobenzene—In a 250 mL, three-neck flask was placed the 2:1 hydroxy terminated oligomer from Example 30 (3.00 g, 4.02 mmol), cyanogen bromide (1.02 g, 9.6 mmol), and dry acetone (10 mL). The reaction mixture was cooled to −20 to 0° C. and triethylamine (1.23 mL, 892 mg, 8.82 mmol) was added drop-wise so as to keep the temperature between −10 and 0° C. Following the addition, the reaction was stirred at 0° C. for an additional 2 hr. The mixture was poured onto water (100 mL) and the water extracted with ether (2×50 mL). The ether layers were collected and immediately filtered through a short silica gel plug. The solvent was removed and the resulting oil dried under vacuum to yield the 2:1 bisphenol A6F based CE resin (2.8 g, 88%) as a yellow oil. IR [cm$^{-1}$]: ν 3073, 2244 (CN), 2236 (CN), 1593, 1508, 1480, 1242, 1210, 1176, 968, 954, 830.

EXAMPLE 36

Synthesis of 2:1 hydroxy terminated oligomer based on resorcinol and 4,4'-dichlorodiphenylsulfone To a 250 mL three neck flask fitted with a thermometer, Dean-Stark trap with condenser, and nitrogen inlet was added resorcinol (10.0 g, 90.8 mmol), 4,4'-dichlorodiphenylsulfone (13.04 g, 45.4 mmol), powdered $K_2CO_3$ (25.07 g, 182 mmol), and N,N-dimethylformamide (80 mL). After filling the Dean-Stark trap with toluene and adding 5 mL to the reaction flask, the mixture was heated to reflux at 145° C. The water formed in the reaction was removed by azeotropic distillation. The mixture was refluxed for 9–12 hr until no more water was observed being collected in the Dean-Stark trap. The remaining toluene was then removed by distillation and the reaction mixture cooled to ambient temperature. Water was added (300 mL) to the reaction mixture. At this point the mixture was slightly basic and 2 M HCl (300 mL) was added. The mixture was then extracted with ether (2×100 mL) and the combined ether layers washed with 2 M HCl (1×100 mL) and water (1×100 mL). Carbon black (2 g) was added and the ether filtered through a short plug of silica gel to remove any insoluble components. The solvent was removed and the oil vacuum dried to yield the analytically pure 2:1 hydroxy terminated oligomer (18.7 g, 95%) as a white solid.

EXAMPLE 37

Synthesis of 2:1 CE oligomer based on resorcinol and 4,4'-dichlorodiphenylsulfone—The 2:1 hydroxy terminated oligomer from Example 36 (10.0 g, 23.0 mmol) was transferred to a 50 mL three-neck flask fitted with a thermometer. Cyanogen bromide (5.37 g, 50.7 mmol) and dry acetone (10 mL) were added under nitrogen. The resulting mixture was cooled to between −20 and 0° C. and triethylamine (7.0 mL, 5.13 g, 50.7 mmol) dissolved in 3 mL acetone was added drop-wise so as to keep the temperature of the reaction mixture between −20 and 0° C. After the addition, the reaction was stirred below 0° C. for an additional 1 hr. Water (100 mL) was added and the reaction mixture extracted with ether (2×100 mL). The ether layers were collected, washed with 1% NaCl (aq.) (100 mL) and 10% $K_2CO_3$ (aq.) (100 mL), separated, then filtered through a short silica plug, and the solvent removed. Following vacuum drying the 2:1 oligomeric CE (10.0 g, 90%) was isolated as a white solid.

EXAMPLE 38

Copper (II) curing of 2:1 oligomeric CE based on resorcinol and 1,3-dibromobenzene to 350° C.—To the solid CE resin synthesized in Example 2 was added the Cu (II) acetylacetonate (2% by weight) at 50° C. Once the Cu (II) acetylacetonate had been evenly dispersed the sample was cooled and used in the DSC and TGA studies. The yellowish mixture was cured by heating at 125° C. for 1 hr, 150° C. for 2 hr, 200° C. for 2 hr, 300° C. for 2 hr and 350° C. for 1 hr. The DSC thermogram of the mixture exhibited an exotherm beginning at 75° C. and ending at around 200° C., showing that the addition of a catalytic amount of Cu (II) acetylacetonate reduced the initial curing temperature by approximately 200° C. The thermoset exhibited a glass transition temperature at around 185° C. TGA analysis revealed that when heating under nitrogen to 1000° C. the system began to lose weight at around 400° C. with an overall char yield of around 58%.

EXAMPLE 39

Chromium (III) curing of 2:1 oligomeric CE based on resorcinol and 1,3-dibromobenzene to 350° C.—To the solid CE resin synthesized in Example 2 was added the Cr (III) acetylacetonate (2% by weight) at 50° C. Once the Cr (III) acetylacetonate had been evenly dispersed the sample was cooled and used in the DSC and TGA studies. The yellowish mixture was cured by heating at 125° C. for 1 hr, 150° C. for 2 hr, 200° C. for 2 hr, 300° C. for 2 hr and 350° C. for 1 hr. The DSC thermogram of the mixture exhibited an exotherm beginning at 170° C. and ending at around 270° C., showing that the addition of a catalytic amount of Cr (III) acetylacetonate reduced the initial curing temperature by approximately 80° C.

EXAMPLE 40

Manganese (III) curing of 2:1 oligomeric CE based on resorcinol and 1,3-dibromobenzene to 350° C.—To the solid CE resin synthesized in Example 2 was added Mn (III) acetylacetonate (2% by weight) at 50° C. Once the Mn (III) acetylacetonate had been evenly dispersed the sample was cooled and used in the DSC and TGA studies. The yellowish mixture was cured by heating at 125° C. for 1 hr, 150° C. for 2 hr, 200° C. for 2 hr, 300° C. for 2 hr and 350° C. for 1 hr. The DSC thermogram of the mixture exhibited an exotherm beginning at 95° C. and ending at around 240° C., showing that the addition of a catalytic amount of Mn (III) acetylacetonate reduced the initial curing temperature by approximately 155° C.

EXAMPLE 41

Chromium (III) curing of 2:1 oligomeric CE based on bisphenol A and 1,3-dibromobenzene to 350° C.—To the solid CE resin synthesized in Example 15 was added the Cr (III) acetylacetonate (2% by weight) at 50° C. Once the Cr (III) acetylacetonate had been evenly dispersed the sample was cooled and used in the DSC and TGA studies. The yellowish mixture was cured by heating at 125° C. for 1 hr, 150° C. for 2 hr, 200° C. for 2 hr, 300° C. for 2 hr and 350° C. for 1 hr. The DSC thermogram of the mixture exhibited an exotherm beginning at 150° C. and ending at around 250° C., showing that the addition of a catalytic amount of Cr (III) acetylacetonate reduced the initial curing temperature by approximately 120° C. The thermoset exhibited a glass transition temperature at around 190° C.

EXAMPLE 42

Low Temperature Synthesis of 2:1 CE resin based on bisphenol A and 1,3-dibromobenzene—In a 250 mL, three-neck flask was placed the 2:1 hydroxy terminated oligomer from Example 14 (50.0 g, 94.2 mmol), cyanogen bromide (20.9 g, 196 mmol), and dry acetone (10 mL). The reaction mixture was cooled to −78° C. and triethylamine (29.7 mL, 21.6 g, 213 mmol) was added drop-wise so as to keep the temperature around −78° C. Following the addition, the reaction was stirred at −78° C. for an additional 1 hr. The mixture was poured onto water (300 mL) and the water extracted with ether (2×200 mL). The solvent was removed in vacuo and the resulting residue mixed with 400 mL of a hexane/methylene chloride mixture (1:1). The mixture was then filtered through a short silica plug to remove the $Et_3N^+Br^-$ salt and the solvent removed in vacuo to yield the 2:1 bisphenol A based CE resin (52.1 g, 95%) as a yellow oil.

Obviously, many modifications and variations of the present invention are possible in light of the above teachings. It is therefore to be understood that the claimed invention may be practiced otherwise than as specifically described.

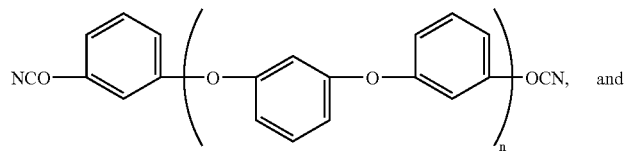

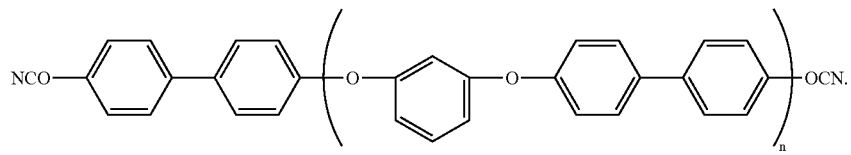

What is claimed is:

1. A cyanate ester comprising the formula:

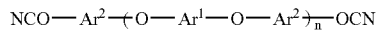

wherein $Ar^1$ is a divalent aromatic radical selected from the group consisting of substituted or unsubstituted phenyl, substituted or unsubstituted o-phenyl, substituted or unsubstituted m-phenyl, and substituted or unsubstituted p-phenyl;

wherein $Ar^2$ is a divalent aromatic radical selected from the group consisting of a substituted or unsubstituted aromatic ring, substituted or unsubstituted fused aromatic rings, a substituted or unsubstituted aromatic ring assembly with or without intervening groups, and combinations thereof, with the proviso that when $Ar^2$ is substituted or unsubstituted phenyl, then $Ar^1$ is substituted or unsubstituted m-phenyl, $Ar^2$ is substituted or unsubstituted m-phenyl, or both; and wherein n is a positive integer.

2. The cyanate ester of claim 1, wherein $Ar^2$ is selected from the group consisting of a phenyl, an m-phenyl, a biphenyl, a 4,4'-biphenyl, and a bisphenol residue.

3. The cyanate ester of claim 1, wherein n is from 1 to 10.

4. The cyanate ester of claim 1, wherein the cyanate ester is selected from the group consisting of:

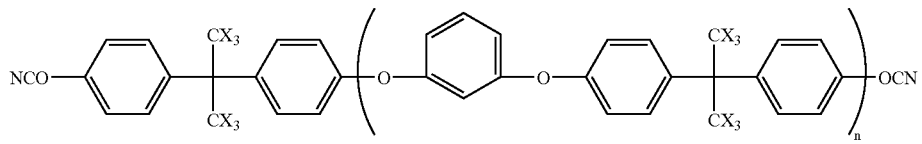

wherein each X is independently selected from the group consisting of H and F,